Sept. 28, 1937.  F. W. POOLEY  2,094,374
BRAKE CONTROL MECHANISM
Filed Sept. 5, 1936   2 Sheets-Sheet 1
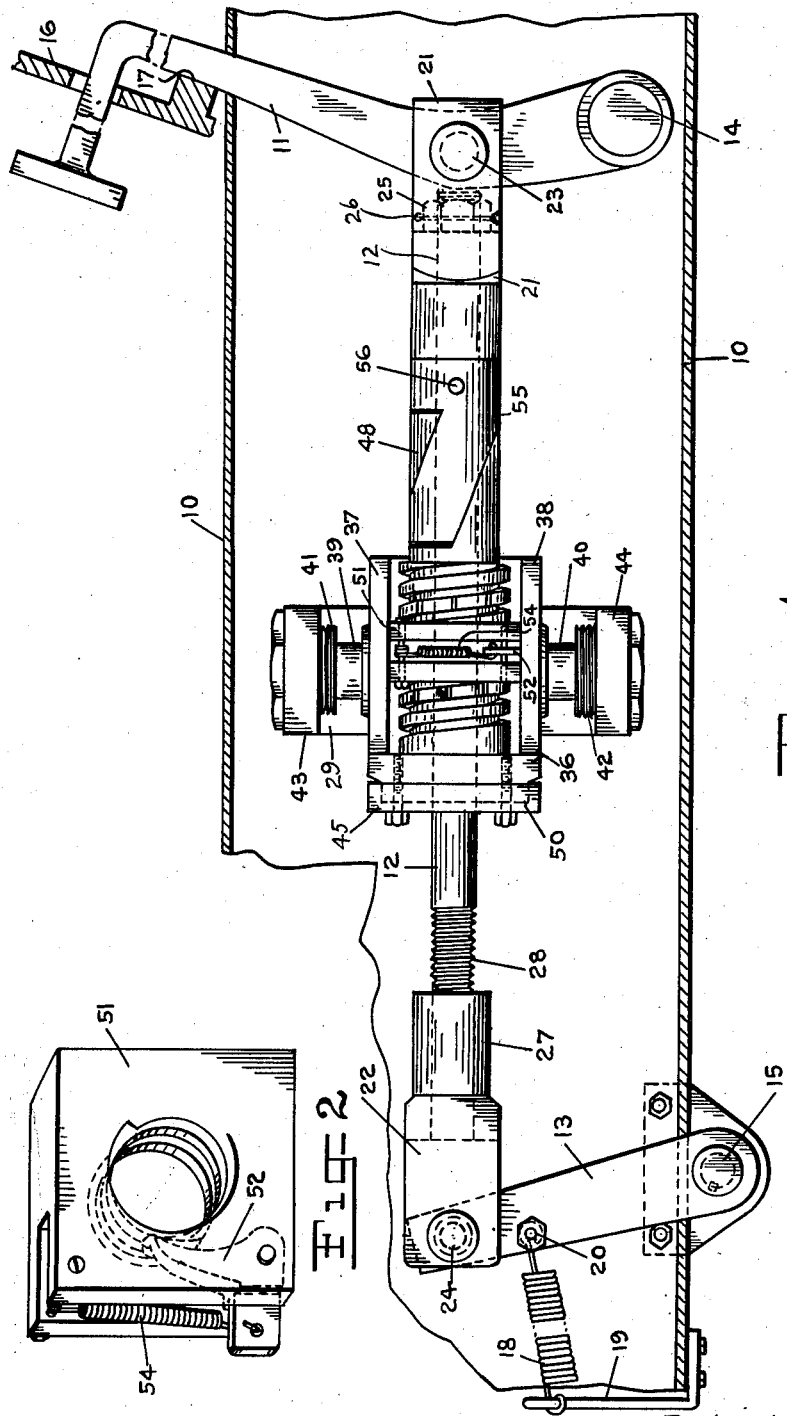
INVENTOR.
Frederick W. Pooley
BY Arthur H. Serrell
his ATTORNEY.

Sept. 28, 1937.   F. W. POOLEY   2,094,374
BRAKE CONTROL MECHANISM
Filed Sept. 5, 1936   2 Sheets-Sheet 2
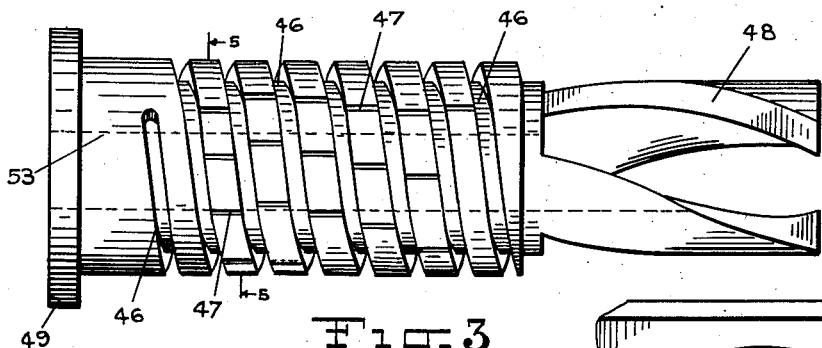
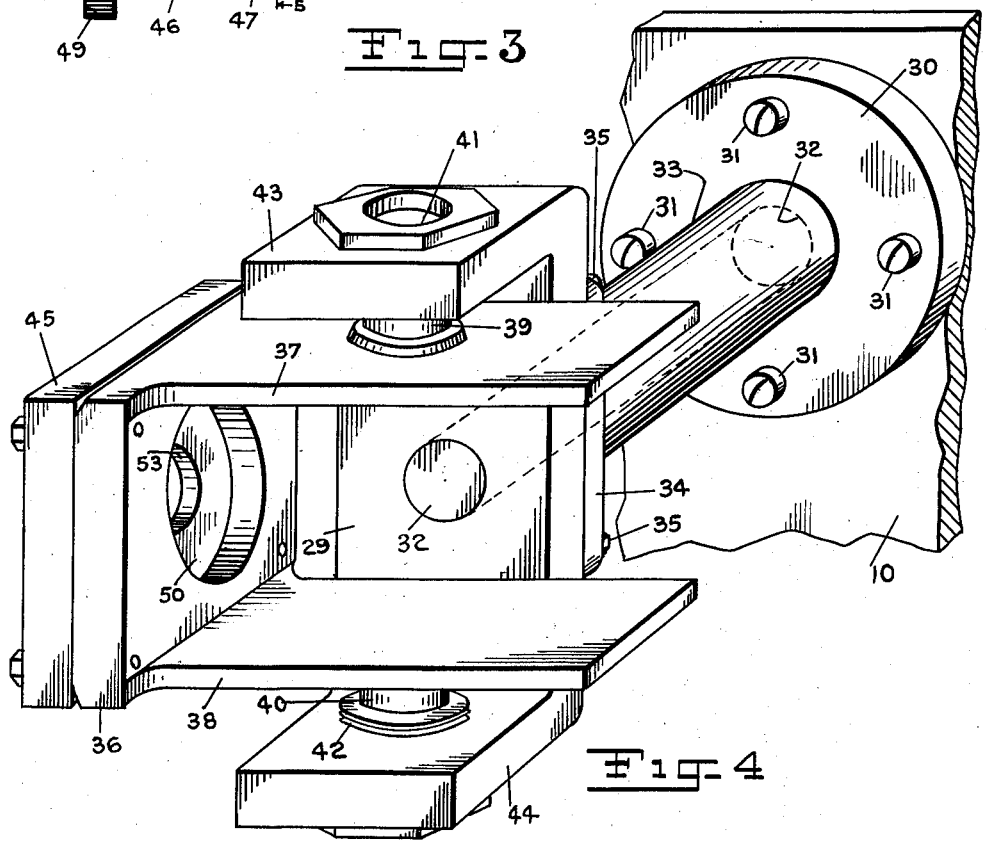
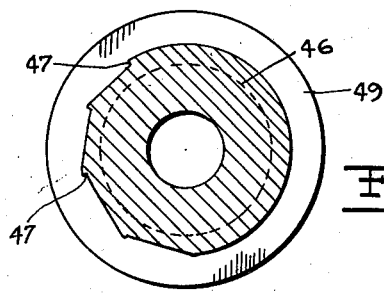
INVENTOR.
Frederick W. Pooley
BY Arthur H. Serrell
his ATTORNEY.

Patented Sept. 28, 1937

2,094,374

UNITED STATES PATENT OFFICE 2,094,374

BRAKE CONTROL MECHANISM

Frederick W. Pooley, Brooklyn, N. Y.

Application September 5, 1936, Serial No. 99,579

8 Claims. (Cl. 188—196)

My present invention relates in general to a controlling mechanism for braking systems and it particularly concerns a mechanism of this type which is utilized in connection with automobiles and the like.

One of the objects of my invention is to provide a brake controlling mechanism in which the brake pedal leverage ratio is greatly reduced, so that manual application of the brakes requires relatively little effort on the part of the operator, and to accomplish this desirable result without necessitating frequent manual adjustment of the braking system which is a customary procedure under the present practice. In current automotive brake design the brake pedal leverage ratio is approximately 4 to 1, which leverage advantage is substantially the maximum attainable if the arcuate travel of the brake pedal is to be confined to limits which do not require frequent take-up in the system to compensate for backlash in the same and for wear in the brake lining. The brake control mechanism constructed in accordance with the present invention, as herein disclosed, obviates the mechanical limitations heretofore restricting the brake pedal lever ratio, so that, in the instant case, any desirable constant mechanical leverage advantage may be employed.

An important object of the invention is to provide an automatically operative take-up device utilized in connection with the braking system, and forming a part of the same, to compensate for permanent elongation in the system only as it occurs by reason of backlash in the system proper and wear in the brake lining.

The primary object of the invention is to construct a take-up device in the braking system which automatically permits successively greater arcuate degrees of travel of the brake pedal after each operation of the take-up device. Consequently, during operation of the braking system in accordance with the present invention, take-up operations occur in the same when required through successively longer periods of wear in the lining of the brake, each of such operations facilitating a further advance movement of the system.

A still further object of the invention is to utilize the customary floor board stop as a forward limiting position of travel of the brake pedal of the braking system indicative of the fact that the brake shoes of the system should be relined.

My invention also includes other objects, advantages and novel features of construction and arrangement hereinafter more particularly referred to, with the detail description of the same, in connection with the accompanying drawings, which illustrate the invention in its preferred mechanical embodiment.

Referring to the drawings:

Fig. 1 is a side elevation of the improved brake control mechanism as it appears mounted upon the chassis of an automobile;

Fig. 2 is an enlarged detail perspective view of the reciprocally movable pawl element of the take-up device of the control mechanism;

Fig. 3 is an enlarged detail side elevation of the worm ratchet and cam follower element of the improved brake control mechanism;

Fig. 4 is an enlarged detail perspective view of the housing or retaining member for the elements of the mechanism shown in Figs. 2 and 3, and Fig. 5 is a section view taken on line 5—5, Fig. 3.

With reference particularly to Fig. 1, the form of vehicle chassis with which the mechanism embodying the present inventive conception is preferably associated is that of an automobile, which customarily employs parallel channel members in its construction. Only one of the channel members of the chassis construction is shown as indicated in the drawings at 10 in order to illustrate the position of the brake mechanism with respect thereto, and to obviate unnecessary duplication. It will be understood, however, that the invention is not merely limited in scope to the field of automobile practice, as its usefulness extends to any type of braking system in which wear occurs during use. The customarily employed elements of the brake system illustrated comprise a foot pedal lever 11, a connecting rod 12 and a lever 13. The foot pedal 11 is suitably mounted for pivotal movement on a shaft 14 secured between the channel members of the chassis. Lever 13 is similarly mounted upon a shaft 15, the same being keyed thereto, the movement of which is transmitted in the customary manner to effect a braking operation. The brake portion proper of the system is not indicated inasmuch as the same is of the usual construction. The foot pedal 11, as employed in this type of device forms the actuating means through which lever 13 is urged to effect a braking operation by manual effort. If desirable, instead of the type of foot lever shown, the actuating lever of the system may be constructed in the form of a hand brake. In accordance with the teaching of the present invention, the floor board of the automobile designates the forward limiting position of the foot pedal 11, the same being indicated in the drawings at 16. A stop 17 determines the other limiting position of the pedal 11. A spring 18 connected to an extension piece 19, secured to the channel 10 of the automobile chassis, and to lever 13 as indicated at 20 maintains the braking system in a normal inoperative position with the pedal lever 11 against the stop 17.

The connecting rod 12 adjoining pedal lever 11 and lever 13 is pivotally secured between the same by means of the respective clevis connections 21 and 22 and pins 23 and 24. The pin connection 23 of the clevis joint 21 and pedal lever 11 is made relatively close to the fixed pivot point of the lever, which is determined by the fixed shaft 14, so that the leverage advantage afforded the operator of the pedal is as much greater than the customary 4 to 1 leverage ratio as is desired. For practical consideration, sufficient leverage advantage is obtained at a ratio of 6 or 8 to 1, the same greatly decreasing the manual effort which need be exerted by the operator to apply the brakes of the automobile. Rod 12 is secured in a rotatable position with relation to the clevis 21 by means of a lock nut 25 and pin 26. Clevis 22 is internally screw threaded, at the position indicated by the numeral 27, for receiving the threaded end of rod 12, shown at 28.

Referring to Figs. 2 to 5, inclusive, the detail elements of the take-up device, of which the rotatably positioned connecting rod 12 is a part, are shown. In order to provide for the combination of translational and circulatory movement imparted to the rod 12 by application of the brake pedal, particular provision has been made to meet the problem as disclosed in a general form in my copending application, Serial No. 3,683. In the present case, I provide a holding member 29, which is U-shaped in form and constructed to be pivotally mounted upon a shaft secured to the side of the channel 10 of the automobile chassis. This is accomplished through means of a plate 30 bolted to the channel 10 as indicated at 31. A shaft 32 extends centrally from the plate 30. A sleeve 33 fitting over the shaft 32 constitutes an extension piece from a plate 34, which is secured to the rear of the holding member 29 by means of bolts 35. Shaft 32 is arranged in this manner in parallel relationship to both shafts 14 and 15 which are also associated with the chassis of the automobile.

The yieldable housing or retaining element of the take-up device is indicated in Figs. 1 and 4 of the drawings by the number 36. This portion of the mechanism is also of a U-shaped formation having upper and lower extension arms 37 and 38, respectively. The exterior surfaces of arms 37 and 38 are provided with shafts 39 and 40, respectively, which are slidably secured in bearing pieces 41 and 42 constructed to receive the same in the upper and lower forks of the U-shaped holding member 29. In view of this construction, it will be appreciated that the retaining element 36 is able to accommodate itself to the combination of motions occurring during operation of the pedal lever, inasmuch as the same is oscillatory with respect to the pivot shaft 32 and simultaneously can be moved either upwardly or downwardly through shafts 39 and 40 with respect to the U-shaped holding member 29. The forks or arms of the U-shaped holding member 29 having the bearing elements 41 and 42 therein are indicated in the drawings at 43 and 44.

The retaining element 36 is also provided, Fig. 1, with an end plate 45, which is secured thereto by bolts or otherwise and which internally is constructed to form a thrust bearing for maintaining, in rotatable position therein, a worm ratchet and cam follower, as shown in detail in Fig. 3 of the drawings. With reference to Fig. 3, this unitary piece is shown in detail, the worm portion of the same being designated at 46, the ratchet teeth at 47 and the cam follower at 48. Flange 49 is adapted to fit within the opening provided to receive the same in plate 45, the same being designated in the drawings at 50. A reciprocally movable pawl containing element 51 is adapted to fit upon the worm 46 of the mechanism and to move correspondingly therewith. This element also fits between the inwardly disposed surfaces of the extending arms 37 and 38 of the housing member 36 and is prevented from rotational movement by means of the same. A pivotally mounted pawl 52 is located in the element 51, the same contacting the ratchet teeth 47 of the unitary worm ratchet, and prevents the same from moving in other than a clockwise direction.

A central longitudinally extending opening 53 is provided in the worm ratchet element and the thrust plate 45, the same permitting free movement of the connecting rod 12, which is adapted to fit therein. Spring 54, Fig. 2, normally maintains the pawl 52 in cooperative engagement with the notched or toothed portion 47 of the take-up device. A cam actuator 55 is secured to the rod 12 by means of a pin such as indicated at 56, the teeth of the cam meshing with the teeth of the cam follower 48, which is a unitary part of the worm ratchet.

With particular reference to Figs. 3 and 5, it will be noted that the distance between successive teeth 47 in the worm ratchet increases as the same is urged in a clockwise direction. The pawl element 51 meshing with the worm is adapted to be actuated from right to left as viewed in Fig. 1. Through this means, an increasing graduated arcuate travel of the pedal 11, or forward movement of the brake system, is facilitated after each take-up operation. The pitch of the ratchet teeth is regulated so that in the initial stage of operation of the mechanism, a pedal movement of three inches is required before a take-up operation takes place, and, subsequently, increasingly longer pedal movements are facilitated until a maximum of approximately seven inches occurs, at which time the pedal lever can be advanced, by the operator, to a position substantially against the floor board 16.

In the operation of the brake controlling mechanism, manual force is exerted on pedal lever 11, which pivots about its axis defined by shaft 14. Rod 12 is correspondingly moved in a forward direction and lever 13, through its keyed shaft 15, exerts the braking force in the customary manner. In the position in Fig. 1, the pawl element 51 is illustrated approximately at a halfway point in its progress along the worm ratchet element. Initially the pawl element is set in an extreme position to the left, in Fig. 1, and during the operation of the brake the same is automatically moved toward the right to assume a limiting position in which the pawl 52 engages the last tooth on the ratchet. When this limiting position is reached, the brake system operates as would the usual mechanical brake with no take-up operations occurring.

In the present disclosure, the operator of the brake actuates the same in the usual manner. When sufficient wear has occurred in the brake lining, with the increased brake pedal leverage ratio, to require a take-up operation, the pedal 11 is urged to an advanced position to effect the operation of the take-up device. It will be understood that a take-up operation is effected only when the advanced movement of the braking system is sufficient to cause the same to occur. This action takes place in the following manner. When connecting rod 12 is moved forward by action of the pedal 11, the actuator cam 55 urges the follower cam 48 in a clockwise direction, looking toward the left in Fig. 1, consequently causing a corresponding movement in the worm ratchet element. When this rotational movement is sufficient to have the pawl 52 engage the next approaching tooth or notch 47, the ratchet worm is locked in an advanced position. During the return movement of the braking system through action of the spring 18, the actuator cam 55 in meshing with the follower cam 48 rotates the connecting rod 12 so that the threaded portion 28 of the same is advanced to a further position within the clevis 22. This action is termed a take-up operation inasmuch as the same shortens the distance between the pins 23 and 24 associated with the respective levers 11 and 13. During the continuing action of the device, it will be appreciated that, because of the increasingly graduated steps of the teeth in the ratchet element, successive take-up operations permit increasingly longer arcuate movements of the foot pedal, or forward travel of the connecting rod, before a further take-up action occurs. In view of the same, pedal lever 11 gradually approaches the floor board 16 of the vehicle, to indicate to the operator of the same, by reason of the proximity of the lever thereto during application of the brake, that it is necessary to reline the brakes.

The means for compensating for the permanent elongation in the braking system, as disclosed in the take-up device forming the mechanical embodiment of the present invention, is adaptable for use with any presently known type of automobile braking system. Inasmuch as the inventive concepts herein disclosed may be embodied in other desired forms, various modifications of the disclosed improvements may occur to those skilled in the art and may be made without departing from the scope and purview of the invention, as claimed.

I claim as my invention:

1. A brake control mechanism including a take-up device providing means for compensating for the elongation in the mechanism through wear during use, said device including means for permitting successively greater arcuate degrees of travel of the brake actuating lever of the mechanism before each corresponding take-up operation.

2. A brake control mechanism including a take-up device operative to compensate for the elongation in the mechanism as the same occurs through wear during use, said take-up device including means for automatically permitting successively longer arcuate movements of the braking pedal of the mechanism before each take-up operation of the same.

3. A brake control mechanism including a take-up device for compensating for the elongation in the mechanism caused through wear during use, said take-up device including means for graduating the mechanism so that successively greater forward actuating degrees of travel of the same are required to cause each take-up operation.

4. In a brake control mechanism, a manually operable braking lever, a take-up device for compensating for the elongation in the mechanism caused through wear during use, and means associated with the take-up device for regulating the degree of movement of the braking lever so that the same successively operates through a longer degree of travel to cause each take-up operation.

5. In a brake control mechanism, a take-up device for compensating for the elongation therein caused by wear during use, a manually operable braking lever, a stop defining the maximum limit of safe operation of the braking lever, and means associated with the take-up device for regulating the degree of movement of the lever so that the same successively operates through a greater degree of arcuate travel to cause each succeeding take-up operation and gradually approaches the stop determining the extent of safe operation of the mechanism.

6. In a brake control mechanism, a take-up device comprising a rotatably mounted lever-connecting rod, a housing member including mechanism to rotate said rod to cause a take-up operation, said second mechanism including a ratchet device having teeth therein located at successively greater distances along the periphery of the same to permit correspondingly longer arcuate movements of the brake mechanism before each take-up operation.

7. In a brake control mechanism, a manually operable braking lever, a take-up device for compensating for the elongation in the mechanism through wear during use, said take-up device including a rotatable mounted lever-connecting rod, a housing member including mechanism to rotate said rod to cause the take-up operation, said second mechanism including a worm ratchet wheel and pawl, the worm ratchet having teeth thereon spaced at successively greater distances along its periphery to permit correspondingly longer arcuate degrees of travel of the braking lever before each take-up operation, and means for effecting the operation of the take-up device by movement of the braking lever.

8. A brake control mechanism comprising a take-up device including two pivotally mounted levers for transmitting the braking force, a rotatably mounted screw threaded rod joining said levers, a retaining member for said take-up device securing the rod in slidable engagement therein, a rotatable worm ratchet mechanism and cam follower associated with said retaining member, a cam actuator located on the rod and meshing with the cam follower, said worm ratchet mechanism having teeth thereon spaced at successively greater distances along the periphery of the same, the cam actuator in its forward travel with the rod rotating the follower cam so that when the movement exceeds a regulated limit the cam follower is locked in an advanced position through means of the worm ratchet mechanism, the cam actuator during the return movement of the device rotating the rod to cause a take-up operation as the meshing cams completely engage, the location of the teeth on the worm ratchet permitting regulated successively longer forward arcuate degrees of travel before each corresponding take-up operation.

FREDERICK W. POOLEY.